(12) United States Patent
Patangia et al.

(10) Patent No.: US 12,388,819 B2
(45) Date of Patent: Aug. 12, 2025

(54) SYSTEMS AND METHODS FOR AUTHENTICATING A RESOURCE TRANSFER IN A PEER-TO-PEER RESOURCE SHARING ELECTRONIC NETWORK

(71) Applicant: BANK OF AMERICA CORPORATION, Charlotte, NC (US)

(72) Inventors: Vishal Patangia, West Hills, CA (US); Joehinth Danishkumar Samuel Theodore, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 264 days.

(21) Appl. No.: 18/106,574

(22) Filed: Feb. 7, 2023

(65) Prior Publication Data
US 2024/0267376 A1    Aug. 8, 2024

(51) Int. Cl.
*H04L 9/40* (2022.01)
*H04L 67/1074* (2022.01)

(52) U.S. Cl.
CPC ...... *H04L 63/0869* (2013.01); *H04L 67/1074* (2013.01)

(58) Field of Classification Search
None
See application file for complete search history.

(56) References Cited

U.S. PATENT DOCUMENTS

| | | |
|---|---|---|
| 9,411,976 B2 | 8/2016 | Irvine |
| 9,547,726 B2 | 1/2017 | Ran |
| 10,098,132 B2 | 10/2018 | Tucker |
| 10,257,270 B2 | 4/2019 | Cohn |
| 10,491,685 B2 | 11/2019 | Khayrudinov |
| 10,673,617 B1 | 6/2020 | Antoniou |
| 10,673,645 B2 | 6/2020 | Ansari |
| 10,764,943 B2 | 9/2020 | Gong |
| 11,025,626 B1 | 6/2021 | Todd |
| 11,153,100 B2 | 10/2021 | Hunt |
| 11,170,092 B1 | 11/2021 | Liang |
| 11,626,997 B2 | 4/2023 | Semenovskiy |
| 2010/0011103 A1 | 1/2010 | Luzzatti |

(Continued)

*Primary Examiner* — Philip J Chea
*Assistant Examiner* — James Ross Hollister
(74) *Attorney, Agent, or Firm* — Moore & Van Allen PLLC; Nicholas C. Russell

(57) ABSTRACT

A system is provided for authenticating a resource transfer in a peer-to-peer resource sharing electronic network. In particular, the system may receive a request from a first endpoint device to execute a resource transfer with a second endpoint device. The request from the first endpoint device may comprise a selection or designation of an authentication credential associated with the resource transfer. The system may prompt the second endpoint device for an authentication input. Upon receiving the authentication input from the second endpoint device, the system may validate the authentication input using the authentication credential provided using the first endpoint device. Once the authentication input from the second endpoint device has been validated, the system may execute the resource transfer according to the parameters defined by the first endpoint device. In this way, the system may provide a secure way to execute peer-to-peer resource transfers over a network.

17 Claims, 4 Drawing Sheets

(56) References Cited

U.S. PATENT DOCUMENTS

| | | |
|---|---|---|
| 2011/0035503 A1 | 2/2011 | Zaid |
| 2013/0124546 A1 | 5/2013 | Wormley |
| 2013/0318341 A1 | 11/2013 | Bagepalli |
| 2015/0006895 A1 | 1/2015 | Irvine |
| 2015/0244690 A1 | 8/2015 | Mossbarger |
| 2019/0205889 A1* | 7/2019 | Cantrell ............ G06Q 20/40145 |
| 2020/0162255 A1* | 5/2020 | Hunt ..................... H04L 63/083 |
| 2021/0174329 A1* | 6/2021 | Kursun ................ H04L 67/535 |
| 2021/0174369 A1* | 6/2021 | Lillie ................... G06Q 20/407 |
| 2022/0029831 A1 | 1/2022 | Baek |
| 2022/0398592 A1* | 12/2022 | Black ................. G06Q 20/3674 |
| 2023/0004537 A1 | 1/2023 | Oberhofer |
| 2023/0111678 A1 | 4/2023 | Borrill |
| 2023/0403152 A1* | 12/2023 | Feijoo .................. H04L 9/0894 |

* cited by examiner

SYSTEMS AND METHODS FOR AUTHENTICATING A RESOURCE TRANSFER IN A PEER-TO-PEER RESOURCE SHARING ELECTRONIC NETWORK

FIELD OF THE INVENTION

The present invention embraces a system for authenticating a resource transfer in a peer-to-peer resource sharing electronic network.

BACKGROUND

There is a need for additional security measures when executing a networked resource transfer.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for authenticating a resource transfer in a peer-to-peer resource sharing electronic network. In particular, the system may receive a request from a first endpoint device to execute a resource transfer with a second endpoint device. The request from the first endpoint device may comprise a selection or designation of an authentication credential associated with the resource transfer. The system may prompt the second endpoint device for an authentication input. Upon receiving the authentication input from the second endpoint device, the system may validate the authentication input using the authentication credential provided using the first endpoint device. Once the authentication input from the second endpoint device has been validated, the system may execute the resource transfer according to the parameters defined by the first endpoint device. In this way, the system may provide a secure way to execute peer-to-peer resource transfers over a network.

Accordingly, embodiments of the present disclosure provide a system for authenticating a resource transfer in a peer-to-peer resource sharing electronic network, the system comprising a processing device; a non-transitory storage device containing instructions when executed by the processing device, causes the processing device to perform the steps of receiving a resource transfer request from a first endpoint device, wherein the resource transfer request comprises a selection of a second endpoint device as a recipient; initiating an authentication check associated with the resource transfer request, wherein the authentication check comprises prompting the second endpoint device to provide an authentication input; receiving the authentication input from the second endpoint device; validating the authentication input by comparing the authentication input with a shared authentication credential associated with the resource transfer request; and based on validating the authentication input, executing a resource transfer according to one or more parameters defined in the resource transfer request.

In some embodiments, validating the authentication input comprises detecting a match between the authentication input and the shared authentication credential; and based on detecting the match, determining that the second endpoint device has provided a correct authentication input.

In some embodiments, the shared authentication credential is selected by the first endpoint device, wherein the shared authentication credential comprises at least one of a passcode, password, or PIN.

In some embodiments, the shared authentication credential is automatically generated, wherein generating the shared authentication credential comprises inputting the one or more parameters and one or more seed values into a hash algorithm; and computing a hash output value.

In some embodiments, the authentication check is controlled by an artificial intelligence module configured to analyze historical resource transfer data associated with the first endpoint device; detect that the second endpoint device is a past recipient for historical resource transfers associated with the first endpoint device; and disable the authentication check for the resource transfer.

In some embodiments, the authentication check is controlled by an artificial intelligence module configured to analyze historical resource transfer data associated with the first endpoint device; detect that at least one of the one or more parameters defined in the resource transfer request exceeds a defined threshold; and enable the authentication check for the resource transfer.

In some embodiments, the one or more parameters comprise at least one of a resource amount, resource format, and timeframe for the resource transfer.

Embodiments of the present disclosure also provide a computer program product for authenticating a resource transfer in a peer-to-peer resource sharing electronic network, the computer program product comprising a non-transitory computer-readable medium comprising code portions for receiving a resource transfer request from a first endpoint device, wherein the resource transfer request comprises a selection of a second endpoint device as a recipient; initiating an authentication check associated with the resource transfer request, wherein the authentication check comprises prompting the second endpoint device to provide an authentication input; receiving the authentication input from the second endpoint device; validating the authentication input by comparing the authentication input with a shared authentication credential associated with the resource transfer request; and based on validating the authentication input, executing a resource transfer according to one or more parameters defined in the resource transfer request.

In some embodiments, validating the authentication input comprises detecting a match between the authentication input and the shared authentication credential; and based on detecting the match, determining that the second endpoint device has provided a correct authentication input.

In some embodiments, the shared authentication credential is selected by the first endpoint device, wherein the shared authentication credential comprises at least one of a passcode, password, or PIN.

In some embodiments, the shared authentication credential is automatically generated, wherein generating the shared authentication credential comprises inputting the one or more parameters and one or more seed values into a hash algorithm; and computing a hash output value.

In some embodiments, the authentication check is controlled by an artificial intelligence module configured to analyze historical resource transfer data associated with the first endpoint device; detect that the second endpoint device is a past recipient for historical resource transfers associated with the first endpoint device; and disable the authentication check for the resource transfer.

In some embodiments, the authentication check is controlled by an artificial intelligence module configured to analyze historical resource transfer data associated with the first endpoint device; detect that at least one of the one or more parameters defined in the resource transfer request exceeds a defined threshold; and enable the authentication check for the resource transfer.

Embodiments of the present disclosure also provide a computer-implemented method for authenticating a resource transfer in a peer-to-peer resource sharing electronic network, the computer-implemented method comprising receiving a resource transfer request from a first endpoint device, wherein the resource transfer request comprises a selection of a second endpoint device as a recipient; initiating an authentication check associated with the resource transfer request, wherein the authentication check comprises prompting the second endpoint device to provide an authentication input; receiving the authentication input from the second endpoint device; validating the authentication input by comparing the authentication input with a shared authentication credential associated with the resource transfer request; and based on validating the authentication input, executing a resource transfer according to one or more parameters defined in the resource transfer request.

In some embodiments, validating the authentication input comprises detecting a match between the authentication input and the shared authentication credential; and based on detecting the match, determining that the second endpoint device has provided a correct authentication input.

In some embodiments, the shared authentication credential is selected by the first endpoint device, wherein the shared authentication credential comprises at least one of a passcode, password, or PIN.

In some embodiments, the shared authentication credential is automatically generated, wherein generating the shared authentication credential comprises inputting the one or more parameters and one or more seed values into a hash algorithm; and computing a hash output value.

In some embodiments, the authentication check is controlled by an artificial intelligence module configured to analyze historical resource transfer data associated with the first endpoint device; detect that the second endpoint device is a past recipient for historical resource transfers associated with the first endpoint device; and disable the authentication check for the resource transfer.

In some embodiments, the authentication check is controlled by an artificial intelligence module configured to analyze historical resource transfer data associated with the first endpoint device; detect that at least one of the one or more parameters defined in the resource transfer request exceeds a defined threshold; and enable the authentication check for the resource transfer.

In some embodiments, the one or more parameters comprise at least one of a resource amount, resource format, and timeframe for the resource transfer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
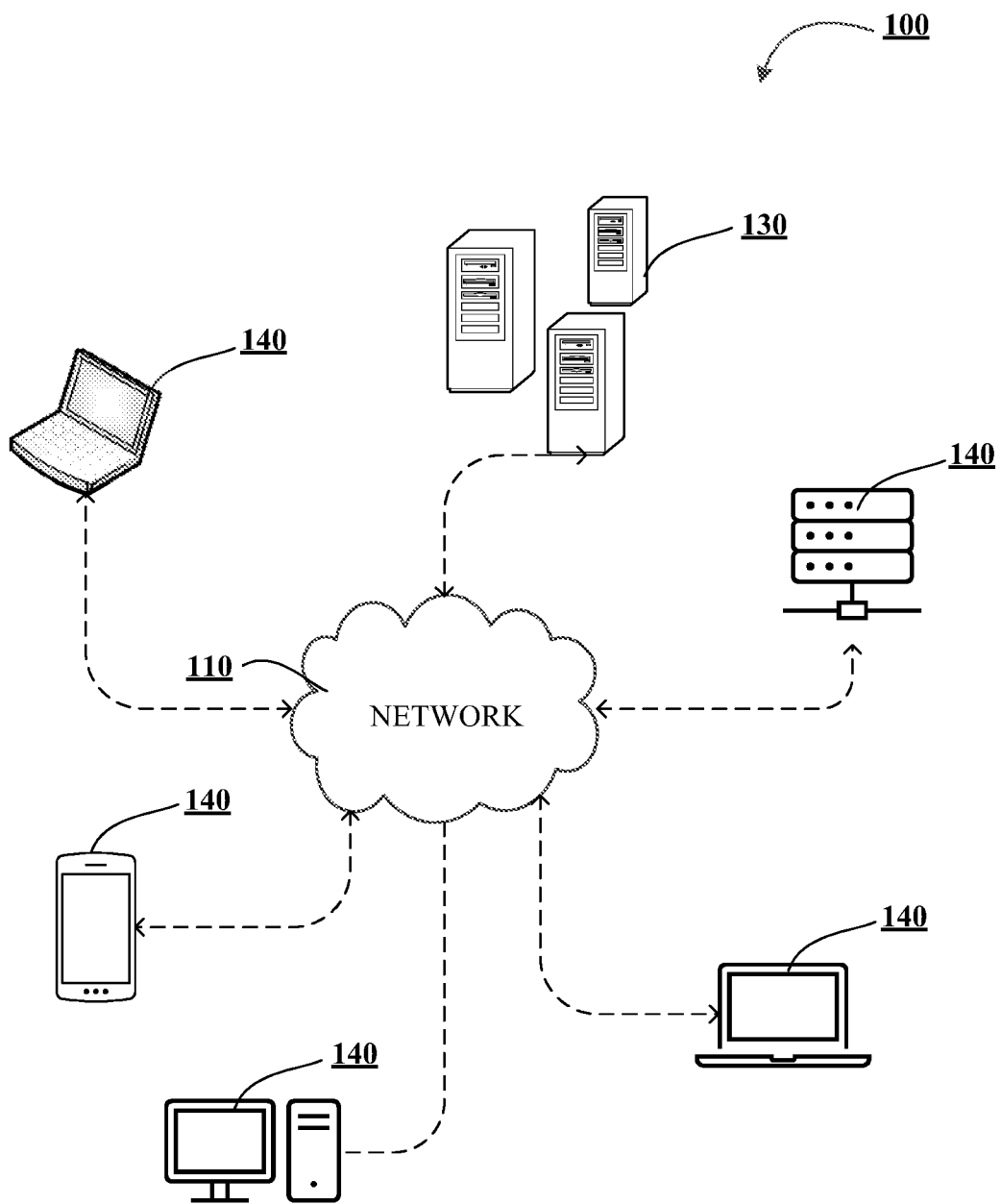
Figure 1B:
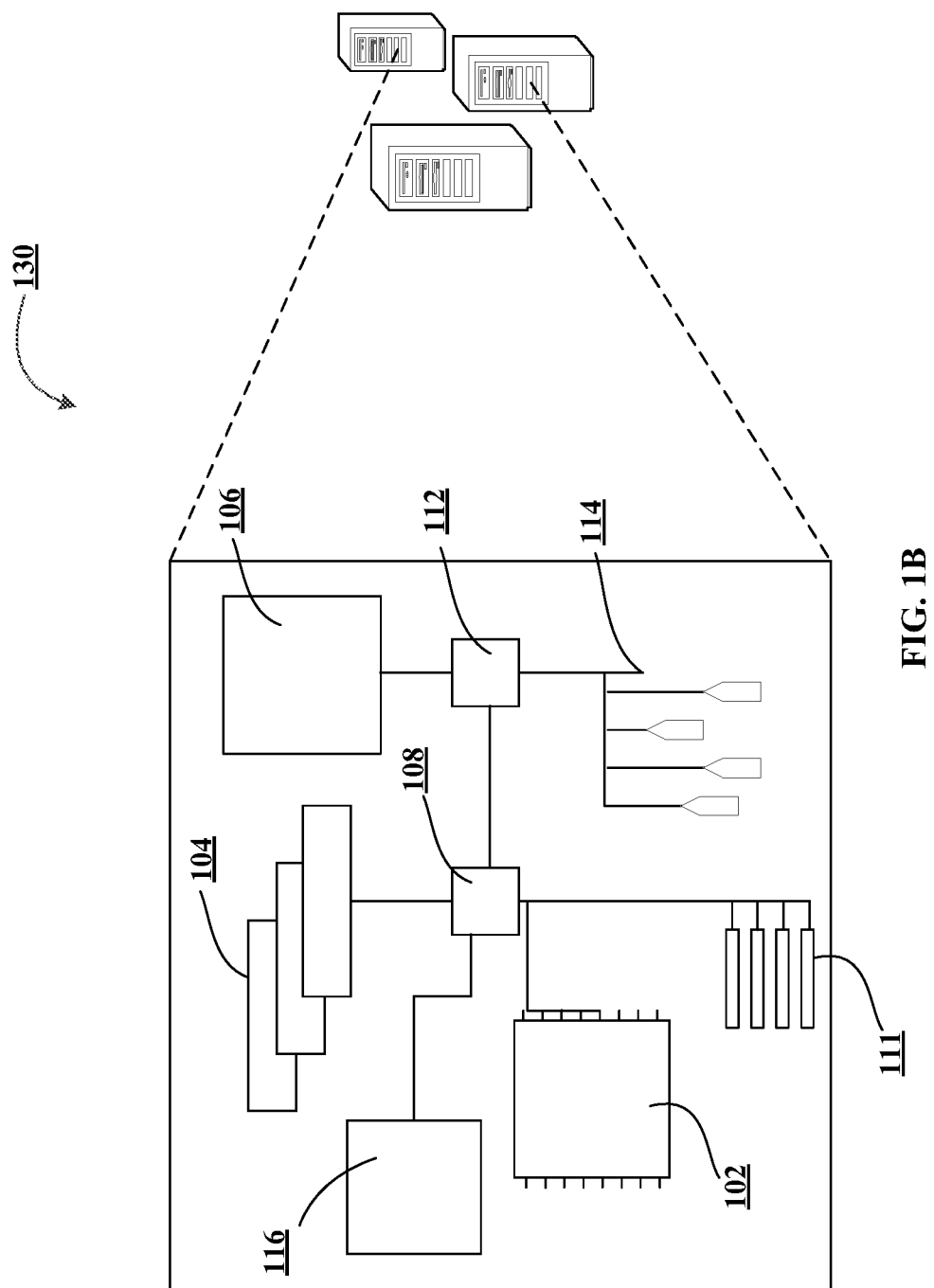
Figure 1C:
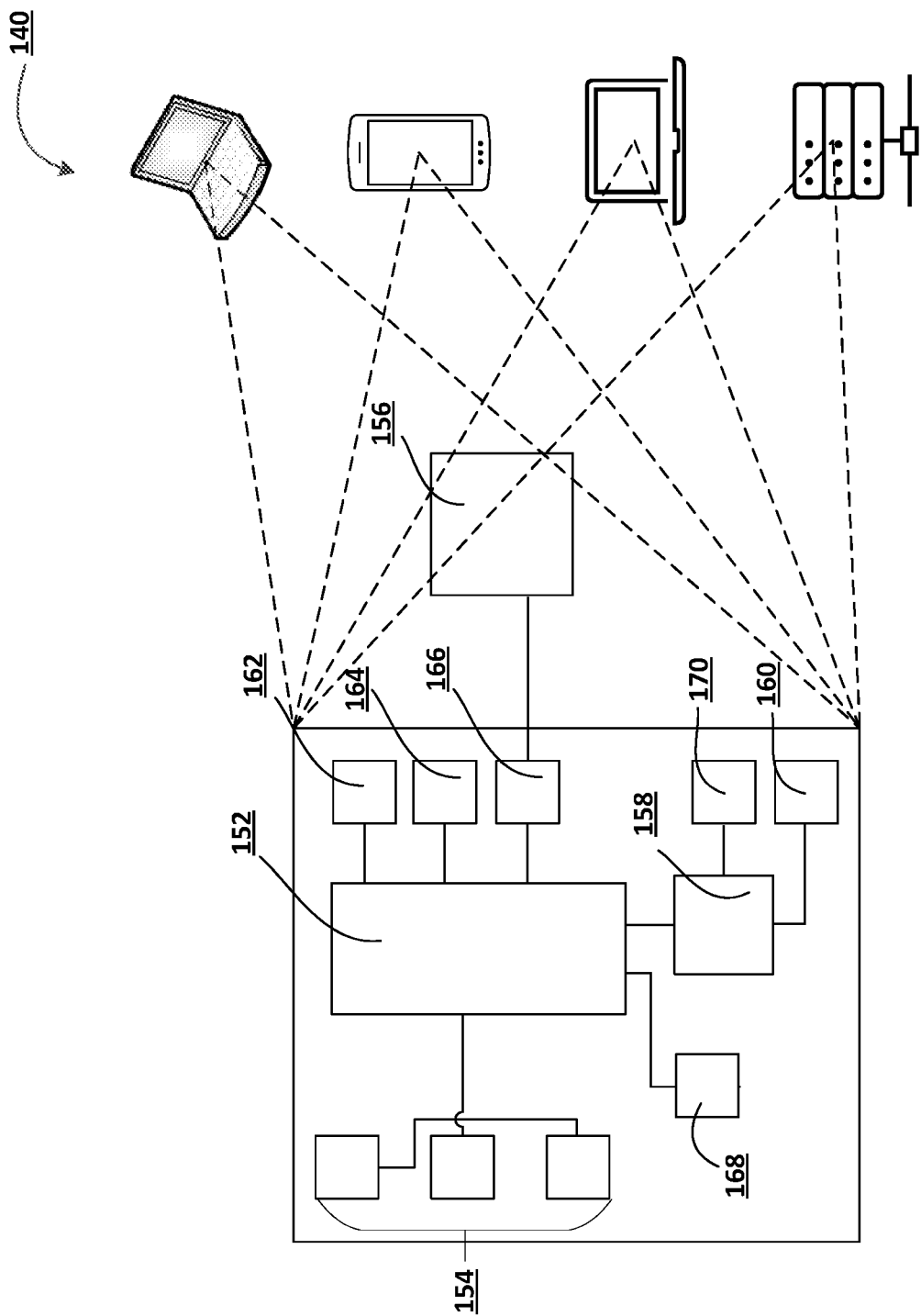
Figure 2:
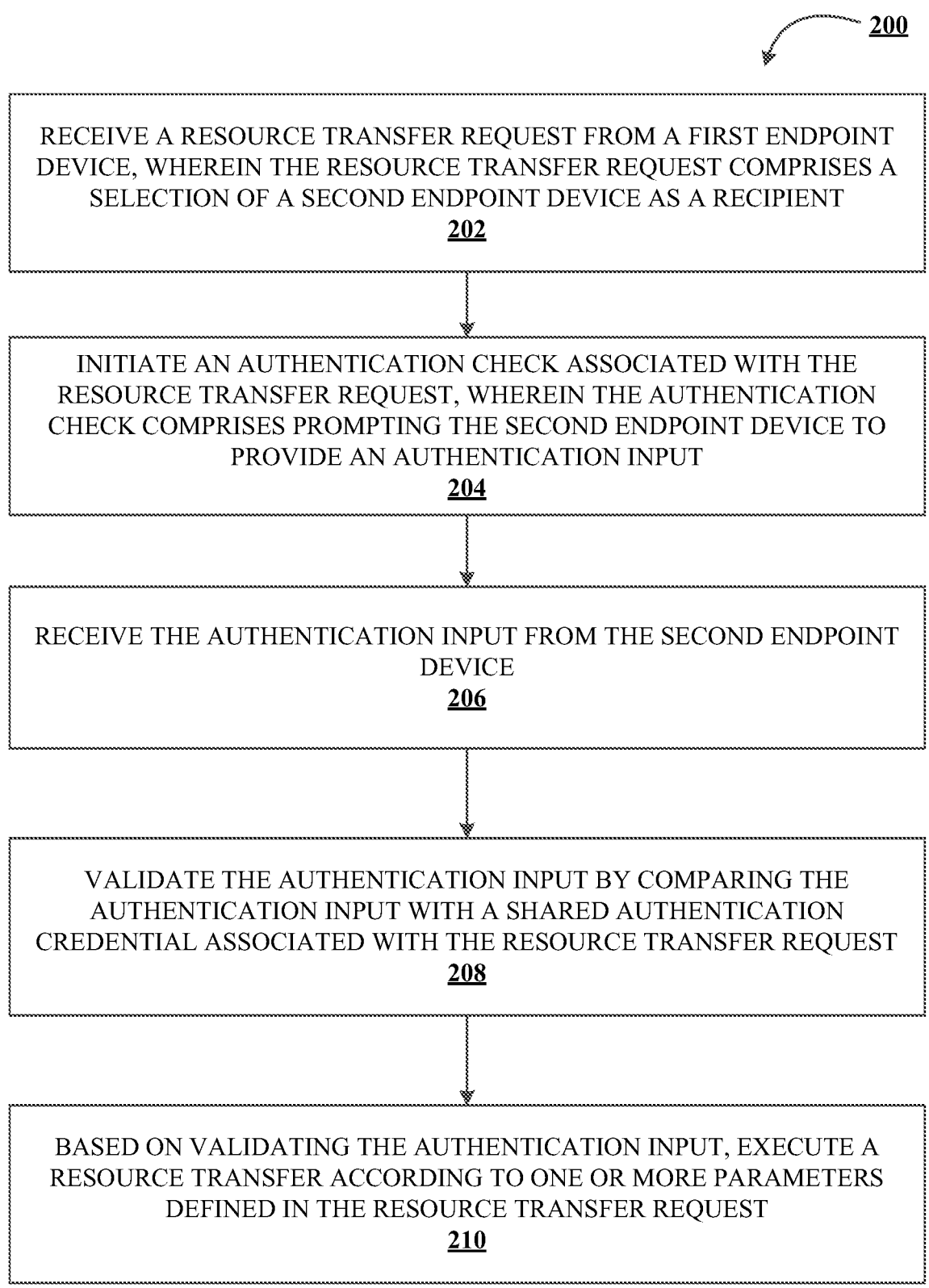

Having thus described embodiments of the invention in general terms, reference will now be made the accompanying drawings, wherein:

FIGS. 1A-1C illustrates technical components of an exemplary distributed computing environment for the system for authenticating a resource transfer in a peer-to-peer resource sharing electronic network; and FIG. 2 illustrates a process flow for authenticating a resource transfer in a peer-to-peer resource sharing electronic network, in accordance with an embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface ("GUI") or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, individual characteristic data (e.g., iris recognition, retina scans, fingerprints, finger veins, palm veins, palm prints, digital bone anatomy/structure and positioning of distal phalanges, intermediate phalanges, proximal phalanges, and/or the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may generally refer to physical or virtual objects that may be used to accomplish the entity's objectives. In this regard, the resources may include computing resources such as processing power, memory allocation, cache space, storage space, data files, network connections and/or bandwidth, electrical power, input/output functions, and the like, or data files (e.g., document files, media files, system files, and/or the like). In other embodiments, resources may refer to financial resources such as funds or digital currencies, where such resources may be linked to an account associated with a user. Accordingly, a "resource transfer" may refer to a transfer of financial resources, such as a funds transfer, transfer of digital currencies, or other type of transaction. A resource transfer may be executed according to "resource transfer data," which may include certain parameters that may be defined by the user and/or a computing device as described herein, where such parameters may include a resource amount to be transferred, a resource type to be transferred (e.g., a particular currency or format for the resource), recipient information, a schedule or timeframe in which the transfer is to be executed, and/or the like.

Users may use a peer-to-peer resource sharing electronic network to perform resource transfers from one endpoint device to another endpoint device (and/or one user to another user). That said, a multilayered, intelligent authentication scheme may be desirable in order to protect the security of the resource transfers executed using the peer-to-peer network. Accordingly, embodiments of the present disclosure provide a system for authenticating a resource transfer in a peer-to-peer resource sharing electronic network. The system may comprise a first endpoint device associated with a first user and a second endpoint device associated with a second user, where the first endpoint device and the second endpoint device are in operative communication through the peer-to-peer resource sharing network. The first user may transmit a request to the system to execute a resource transfer associated with the second endpoint device and/or the second user. In this regard, the first user may access an application installed on the first endpoint device to initiate the resource transfer request, where initiating the resource transfer request may include the first user and/or the first endpoint device providing authentication credentials to log onto and access the system. Examples of authentication credentials that may be provided by the first user and/or the first endpoint device may include a username and password, secure token, individual characteristic data, and/or the like.

The system may support additional security measures for securing the resource transfer. For instance, in addition to providing the authentication credentials associated with the first user and/or the first device, the first user and/or the first endpoint device may select, designate, or provide a shared authentication credential to be linked with the resource transfer. The shared authentication credential may be, for instance, password, passcode, PIN, shared cryptographic key, shared token, and/or the like. It should be understood that in some embodiments, the shared authentication credential may be selected by the first user, whereas in other embodiments, the shared authentication credential may be generated automatically by the system (e.g., by using a random number or character generator, inputting one or more seed values into a cryptographic hash algorithm, and/or the like). Once the shared authentication credential has been designated, the system may require that the recipient (e.g., the second user and/or the second endpoint device) provide an authentication input that matches the shared authentication credential in order to complete the resource transfer. Accordingly, the system may prompt the second user and/or second device to provide the authentication input. Upon receiving said authentication input, the system may compare the authentication input with the shared authentication credential. If a match is detected, the system may complete the resource transfer according to the parameters defined in the resource transfer request. However, if no match is detected, the system may block the resource transfer from being completed. In such embodiments, the system may further be configured to transmit notifications to the first endpoint device and/or the second endpoint device, where the notification indicates that the resource transfer has failed.

In some embodiments, the system may comprise an artificial intelligence ("AI") module or machine learning module that may be configured to intelligently enable or disable the additional authentication checks based on the shared authentication credential. In this regard, the artificial intelligence module may be trained based on data regarding situations in which activation of the additional authentication check may be desirable versus undesirable. For example, the system may automatically enable the additional authentication check upon detecting that the number of resource transfers associated with the first user and/or first endpoint device has reached or exceeded a certain threshold or that the frequency of resource transfers is unusual based on the historical resource transfer data associated with the first user and/or first endpoint device. In other embodiments, the AI module may be configured to automatically enable the additional authentication checks upon detecting that the resource amount associated with the resource transfer request is above a designated threshold or is unusual based on the historical resource transfer data. In yet other embodiments, the AI module may be configured to enable the additional authentication checks for new recipients while disabling the additional authentication checks if the recipient has had a history of resources transfers with the first user and/or first endpoint device, and/or if the recipient has been designated by the first user and/or first endpoint device as a trusted recipient. In this way, the system may intelligently provide additional security functions when they are needed while ensuring an enhanced user experience when the additional security functions are not needed.

An exemplary embodiment is described as follows for illustrative purposes only and should not be construed to restrict or limit the scope of the disclosure provided herein. In one embodiment, a first user may be a customer of an entity such as a financial institution that may host a resource account on behalf of the first user. The first user may wish to initiate a funds transfer (e.g., a resource transfer) to transfer funds (e.g., resources) from a resource account associated with the first user to a resource account associated with a second user, where the second user may be geographically separated from the first user. The first user may access an application installed on the first user's smartphone (e.g., a first endpoint device) to initiate the resource transfer. In this regard, the first user may input resource transfer data and/or metadata associated with the resource transfer into the application. For instance, the application may be configured to present a graphical interface on the display device of the first endpoint device, where the graphical interface may include one or more interface elements for accepting user input, such as text boxes, activatable buttons, selectable areas, drop-down menus, radio buttons, and/or the like. The first user may select a recipient (e.g., the second user), the resource accounts to serve as the source and destination for the resource transfer, the timeframe for the resource transfer (e.g., an instant transfer or a scheduled transfer), and/or the like. For example, the first user may select the recipient by identifying the recipient by name, username, resource account number, or some other type of identifier associated with the second user.

In some cases, the first user may wish to receive additional confirmation that the resources are received by the intended recipient (e.g., the second user). Accordingly, the first user may designate a shared authentication credential (e.g., a passcode such as "12345") by inputting the shared authentication credential into the graphical interface of the application on the first endpoint device. In other embodiments, the shared authentication credential may be generated by the system by inputting information associated with the resource transfer (e.g., the resource transfer data) and/or other seed values into a cryptographic hash algorithm (e.g., SHA, MD5, or the like) to produce a hash output that may serve as the shared authentication credential.

Once the shared authentication credential has been selected or generated, the system may transmit a notification to the second user (e.g., through an application installed on the second user's smartphone) indicating that a resource transfer has been initiated by the first user to the resource account associated with the second user. The notification may further comprise a prompt for the second user to enter an authentication input to continue the resource transfer process. In such cases, the authentication input may include the shared authentication credential (e.g., the shared passcode), where the authentication input is provided by the second user into the graphical interface presented by the application on the second user's smartphone (e.g., the second endpoint device). In other embodiments, the system may prompt the second endpoint device to provide the authentication input automatically. In such embodiments, the application installed on the second endpoint device may retrieve the resource transfer data and/or the seed values into the same hash algorithm that was used to generate the authentication input.

The system may then verify the authentication input provided by the second user and/or second endpoint device by comparing the authentication input with the shared authentication credential. If a match is detected, the system may proceed with the resource transfer to transfer the designated resources from the resource account associated with the first user to the resource account associated with the second user. In this way, the system may ensure that only the intended recipient of the resource transfer may receive the resources.

The artificial intelligence module may intelligently enable or disable additional authentication check as needed. For instance, the system may detect that the first user has transferred resources to the second user on multiple occasions in the past. In such cases, the AI module may disable the authentication check with respect to the current resource transfer. In other cases, the system may detect that the first user has requested to transfer an unusually large amount of resources based on the transaction history associated with the first user's resource account. In such embodiments, the AI module may enable the additional authentication check for the requested resource transfer.

The system as described herein provides a number of technological benefits over resource transfer systems. In particular, by using a shared authentication credential for the resource transfer, the system may increase the security of resource transfers within the peer-to-peer network by preventing the resources from being transferred to an unintended or unauthorized recipient. Furthermore, using the AI module as described herein to intelligently enable or disable the intended authentication check provides the benefits of enhanced security while streamlining the user's experience when using the application to manage resource transfers.

FIGS. 1A-1C illustrate technical components of an exemplary distributed computing environment 100 for the system for authenticating a resource transfer in a peer-to-peer resource sharing electronic network. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for provisioning authenticated access to resources linked with individual characteristic data, in accordance with an embodiment of the present disclosure. The process begins at block 202, where the system receives a resource transfer request from a first endpoint device as a recipient, wherein the resource transfer request comprises a selection of a second endpoint device. The resource transfer request may be a request, for instance, to transfer resources from a resource account of the first user to a resource account of a second user associated with the second endpoint device (e.g., the second user and/or second endpoint device is designated as the recipient for the resources). Accordingly, the selection of the second endpoint device may be submitted by the first user through an application installed on the first endpoint device (e.g., the first user may select a name, username, account number, and/or other identifier of the second user through the graphical interface of the application). The resource transfer request may further comprise the resource transfer data needed for the system to execute the resource transfer, where the resource transfer data may include a resource amount, a resource format, transfer timeframe, and/or the like. In some embodiments, the first user may wish to have additional assurance that the resources will be transferred to the correct recipient (e.g., the second user and/or second endpoint device). In such cases, the system may use additional authentication checks as described below and elsewhere herein.

The process continues to block 204, where the system initiates an authentication check associated with the resource transfer request, wherein the authentication check comprises prompting the second endpoint device to provide an authentication input. The authentication check may be based on a shared authentication credential to be used to perform additional verification checks to ensure that the intended recipient receives the resources. In some embodiments, the first user may select the shared authentication credential by providing the selection of the shared authentication credential through the application installed on the first endpoint device. For example, the first user may designate a passcode (e.g., a character string) as the shared authentication credential. In other embodiments, the shared authentication credential may be automatically generated by the system. In such embodiments, the shared authentication credential may be a hash output value (e.g., an alphanumeric string) that may be generated by inputting resource transfer data (e.g., a recipient identifier, resource account identifiers associated with the resource accounts of the first user and/or second user, timestamp data, and/or the like) along with additional seed values (e.g., randomly generated numbers, salt values, and/or the like) into a hash algorithm.

The process continues to block 206, where the system receives the authentication input from the second endpoint device. The authentication input may be an input provided by the second endpoint device that is intended to match the value of the shared authentication credential. For instance, in embodiments in which the shared authentication credential is a shared passcode designated by the first endpoint device, the system may transmit a notification to the second endpoint device that the first endpoint device is initiating a resource transfer designating the second endpoint device as the recipient. In such embodiments, the notification may further comprise a prompt for second endpoint device to enter the shared passcode associated with the resource transfer. In embodiments in which the shared authentication credential is an automatically generated hash value, the application installed on the second endpoint device may generate the authentication input by inputting the resource transfer data and seed values into the same hash algorithm that was used to generate the hash output value.

The process continues to block 208, where the system validates the authentication input by comparing the authentication input with a shared authentication credential associated with the resource transfer request. Specifically, the system may compare the authentication input with the shared authentication credential to determine whether there is a match between the authentication input and the shared authentication credential. If a match is detected, the system may determine that the second endpoint device has provided the correct authentication input and is thus the intended recipient of the resource transfer. However, if no match is detected, the system may block the resource transfer from being executed and transmit a notification to the first endpoint device and/or the second endpoint device, where the notification indicates that the resource transfer has failed. In some embodiments, the notification may further indicate a reason for the failure (e.g., the second endpoint device has failed the additional authentication check).

The process continues to block 210, where the system, based on validating the authentication input, executes a resource transfer according to one or more parameters defined in the resource transfer request. The parameters within the resource transfer request may be defined according to the resource transfer data (e.g., a source resource account, a destination resource account, amount of resources, resource format, timeframe for the transfer, and/or the like). Upon executing the resource transfer, the system may be configured to transmit notifications to the first endpoint device and/or the second endpoint device that the resource transfer has ben successfully executed. In some embodiments, the AI module of the system may intelligently enable or disable the authentication check based on analyzing the parameters of the resource transfer request and/or historical resource transfer data associated with the first user and/or first endpoint device, and/or the second user and/or the second endpoint device. For instance, if the system detects that the second user or second endpoint device has previously been the recipient of a resource transfer from the first user or first endpoint device, the system may disable the authentication check for the resource transfer request to allow the resource transfer to be executed without the additional authentication check. On the other hand, if the system detects that a parameter defined in the resource transfer request has met a defined threshold (e.g., the resource amount meets or exceeds a defined threshold, or a number of resource transfers within a set time period meets or exceeds a defined threshold) or determines that the parameter is unusual based on analyzing the historical resource transfer data, the system may enable the additional authentication check. In this way, the system may provide the additional security provided by the authentication check while streamlining the user experience intelligently based on historical data associated with the users.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authenticating a resource transfer in a peer-to-peer resource sharing electronic network, the system comprising:
    a processing device;
    a non-transitory storage device containing instructions when executed by the processing device, causes the processing device to perform the steps of:
        receiving a resource transfer request from a first endpoint device, wherein the resource transfer request comprises a selection of a second endpoint device as a recipient;
        initiating an authentication check associated with the resource transfer request, wherein the authentication check comprises prompting the second endpoint device to provide an authentication input;
        receiving the authentication input from the second endpoint device;
        validating the authentication input by comparing the authentication input with a shared authentication credential associated with the resource transfer request, wherein generating the shared authentication credential comprises:
            inputting the one or more parameters and one or more seed values into a hash algorithm; and
            computing a hash output value;
        based on validating the authentication input, executing a resource transfer according to one or more parameters defined in the resource transfer request; and
        processing, via an artificial intelligence module, the authentication check associated with the resource transfer and disable the authentication check for subsequent resource transfers between the first endpoint device and the second endpoint device based on analyzing the parameters of the resource transfer request.

2. The system of claim 1, wherein validating the authentication input comprises:
    detecting a match between the authentication input and the shared authentication credential; and
    based on detecting the match, determining that the second endpoint device has provided a correct authentication input.

3. The system of claim 1, wherein the shared authentication credential is selected by the first endpoint device, wherein the shared authentication credential comprises at least one of a passcode, password, or PIN.

4. The system of claim 1, wherein the authentication check is controlled by an artificial intelligence module configured to:
    analyze historical resource transfer data associated with the first endpoint device;
    detect that the second endpoint device is a past recipient for historical resource transfers associated with the first endpoint device; and
    disable the authentication check for the resource transfer.

5. The system of claim 1, wherein the authentication check is controlled by an artificial intelligence module configured to:
    analyze historical resource transfer data associated with the first endpoint device;
    detect that at least one of the one or more parameters defined in the resource transfer request exceeds a defined threshold; and
    enable the authentication check for the resource transfer.

6. The system of claim 1, wherein the one or more parameters comprise at least one of a resource amount, resource format, and timeframe for the resource transfer.

7. A computer program product for authenticating a resource transfer in a peer-to-peer resource sharing electronic network, the computer program product comprising a non-transitory computer-readable medium comprising code portions for:
    receiving a resource transfer request from a first endpoint device, wherein the resource transfer request comprises a selection of a second endpoint device as a recipient;
    initiating an authentication check associated with the resource transfer request, wherein the authentication check comprises prompting the second endpoint device to provide an authentication input;
    receiving the authentication input from the second endpoint device;
    validating the authentication input by comparing the authentication input with a shared authentication credential associated with the resource transfer request, wherein generating the shared authentication credential comprises:
        inputting the one or more parameters and one or more seed values into a hash algorithm; and
        computing a hash output value;
    based on validating the authentication input, executing a resource transfer according to one or more parameters defined in the resource transfer request; and
    processing, via an artificial intelligence module, the authentication check associated with the resource transfer and disable the authentication check for subsequent resource transfers between the first endpoint device and the second endpoint device based on analyzing the parameters of the resource transfer request.

8. The computer program product of claim 7, wherein validating the authentication input comprises:
    detecting a match between the authentication input and the shared authentication credential; and
    based on detecting the match, determining that the second endpoint device has provided a correct authentication input.

9. The computer program product of claim 7, wherein the shared authentication credential is selected by the first endpoint device, wherein the shared authentication credential comprises at least one of a passcode, password, or PIN.

10. The computer program product of claim 7, wherein the authentication check is controlled by an artificial intelligence module configured to:
- analyze historical resource transfer data associated with the first endpoint device;
- detect that the second endpoint device is a past recipient for historical resource transfers associated with the first endpoint device; and
- disable the authentication check for the resource transfer.

11. The computer program product of claim 7, wherein the authentication check is controlled by an artificial intelligence module configured to:
- analyze historical resource transfer data associated with the first endpoint device;
- detect that at least one of the one or more parameters defined in the resource transfer request exceeds a defined threshold; and
- enable the authentication check for the resource transfer.

12. A computer-implemented method for authenticating a resource transfer in a peer-to-peer resource sharing electronic network, the computer-implemented method comprising:
- receiving a resource transfer request from a first endpoint device, wherein the resource transfer request comprises a selection of a second endpoint device as a recipient;
- initiating an authentication check associated with the resource transfer request, wherein the authentication check comprises prompting the second endpoint device to provide an authentication input;
- receiving the authentication input from the second endpoint device;
- validating the authentication input by comparing the authentication input with a shared authentication credential associated with the resource transfer request, wherein generating the shared authentication credential comprises:
  - inputting the one or more parameters and one or more seed values into a hash algorithm; and
  - computing a hash output value;
- based on validating the authentication input, executing a resource transfer according to one or more parameters defined in the resource transfer request; and
- processing, via an artificial intelligence module, the authentication check associated with the resource transfer and disable the authentication check for subsequent resource transfers between the first endpoint device and the second endpoint device based on analyzing the parameters of the resource transfer request.

13. The computer-implemented method of claim 12, wherein validating the authentication input comprises:
- detecting a match between the authentication input and the shared authentication credential; and
- based on detecting the match, determining that the second endpoint device has provided a correct authentication input.

14. The computer-implemented method of claim 12, wherein the shared authentication credential is selected by the first endpoint device, wherein the shared authentication credential comprises at least one of a passcode, password, or PIN.

15. The computer-implemented method of claim 12, wherein the authentication check is controlled by an artificial intelligence module configured to:
- analyze historical resource transfer data associated with the first endpoint device;
- detect that the second endpoint device is a past recipient for historical resource transfers associated with the first endpoint device; and
- disable the authentication check for the resource transfer.

16. The computer-implemented method of claim 12, wherein the authentication check is controlled by an artificial intelligence module configured to:
- analyze historical resource transfer data associated with the first endpoint device;
- detect that at least one of the one or more parameters defined in the resource transfer request exceeds a defined threshold; and
- enable the authentication check for the resource transfer.

17. The computer-implemented method of claim 12, wherein the one or more parameters comprise at least one of a resource amount, resource format, and timeframe for the resource transfer.

* * * * *